United States Patent
Bouffiou et al.

[15] 3,653,282
[45] Apr. 4, 1972

[54] POWER TOOL TURRET ASSEMBLY

[72] Inventors: Russell D. Bouffiou, McFarland; Christian A. Nielsen, Madison, both of Wis.

[73] Assignee: Giddings & Lewis, Inc., Fond du Lac, Wis.

[22] Filed: Oct. 13, 1969

[21] Appl. No.: 865,630

[52] U.S. Cl. ..................................74/815, 29/39, 74/813 C, 74/813 L, 74/818, 74/821, 74/826, 408/35
[51] Int. Cl. ..........................................................B23b 29/32
[58] Field of Search....................74/826, 824, 823, 822, 821, 74/817, 816, 815, 813; 29/42, 40, 39; 77/25; 408/35

[56] References Cited

UNITED STATES PATENTS

| | | | |
|---|---|---|---|
| 2,956,454 | 10/1960 | Hansen | 77/25 |
| 2,936,656 | 5/1960 | Conover | 74/826 |
| 2,952,169 | 9/1960 | Johnson | 74/826 X |
| 3,204,490 | 9/1965 | Jones et al. | 74/826 X |
| 3,222,955 | 12/1965 | Ross et al. | 74/826 |

*Primary Examiner*—Milton Kaufman
*Assistant Examiner*—F. D. Shoemaker
*Attorney*—Wolfe, Hubbard, Leydig, Voit & Osann

[57] ABSTRACT

A machine tool turret head, more particularly a power operated turret head, is provided with fluid power actuated toggle means for axially clamping the turret head to the machine tool ram or saddle. When a wedge member is withdrawn from a position between the toggle members, the turret head is released from a clamped work position and allowed to slide axially for a limited distance along a turret head stem. Logic circuitry and a resolver are employed to cause a motor and drive train to rotate the turret head and to locate the head via the most expeditious route within the predetermined initial angular tolerance limits of a new work position. The wedge member is then reinserted between the toggle means to move the turret axially back along the stem, and reclamp the turret in its new work position. A lost motion coupler is included in the drive train to allow the turret head to rotate slightly as it moves into its clamped position without damage to the associated drive train or other parts.

16 Claims, 12 Drawing Figures

INVENTORS.
RUSSELL D. BOUFFIOU
CHRISTIAN A. NIELSEN
BY
Wolfe, Hubbard, Voit & Osann
ATTORNEYS.

Fig. 11.

POWER TOOL TURRET ASSEMBLY

BACKGROUND OF THE INVENTION

This invention relates generally to the rotary indexing of power operated machine tool members, and more particularly to the automatic rotary indexing of power operated turret-type tool holding heads which are commonly employed, for example, in boring mills and lathes.

The concept of a rotatable machine tool turret head is a very old one, and improvement inventions upon the basic concept are numerous. One improvement area which has received considerable attention involves rotating the turret by remotely controlled power rather than manually. In order for such a power operated turret head to be technically and commercially successful, it must be capable of accomplishing a number of tasks. It must be capable of being rigidly secured so that the cutting tool engaging in the workpiece will be held in a precisely definite position at all times. The rotatable turret head and the turret power operating system must be capable of releasing the turret head from its originally secured position so that it may be freely rotated to allow another tool upon the head to engage the workpiece. While not strictly necessary, it is highly desirable that the turret head be rotatable in either a clockwise or a counter-clockwise direction so as to bring the new tools into position by the most expeditious route. Further, the turret head and power system must be capable of re-clamping the turret head to the machine so that the newly indexed tool can rigidly engage the workpiece. Moreover, it is desirable that this unclamping, rotation, and subsequent reclamping of the turret head be done in a reasonably rapid manner to eliminate unproductive machine and labor time.

While several mechanisms can accomplish these goals with varying degrees of efficiency, many of them are excessively complex, or are expensive to maintain, or do not accomplish these goals as adequately as might be desired, or have a combination of these faults.

It is, accordingly, the general object of this invention to provide a novel and useful form of a tool holding turret which is compact, relatively simple in construction and capable of rapidly rotating, accurately locating, and powerfully clamping the turret head at any one of a plurality of pre-selected tool working positions.

Put more specifically, an object of the present invention is to provide a power operated tool turret assembly of the foregoing type, which may be unclamped from any given tool operating position, rotated to any other pre-designated tool operating position, and fixedly re-clamped into place, with a high degree of precision and firmness, but without undesirable over-rigidity, all by remotely controlled circuitry.

Another object is to provide a turret head clamp mechanism of the character set forth above and which is compactly contained within the supporting pivot stem of the turret head.

Still another object is to provide an adjustable clamping mechanism of the above type and which is self-equalizing to compensate for slight structural and operational irregularities within the mechanism itself while obtaining extremely accurate location of the cutting tool in the cutting position.

Yet another object is to provide a mechanism which will maintain clamping pressure on the turret head without continuous maintenance of fluid pressure in the mechanism.

Other objects and advantages of the invention will become apparent to the drawings, in which:

FIG. 1 is a fragmentary view, in perspective, of the novel turret construction which is shown mounted on a vertical boring machine, only a part of the boring machine being shown;

GENERAL DESCRIPTION OF THE EXEMPLARY MACHINE TOOL

While the invention has been shown and is described in some detail with reference to a particular embodiment, most particularly a vertcal boring machine configuration, we do not intend to limit the invention to that or any other particular embodiment. On the contrary, we intend to cover all alterations, modifications, and equivalents that may be included within the spirit and scope of the invention.

Turning first to FIG. 1, there is shown an exemplary tool holding turret 10 for a vertical boring mill, the latter being only fragmentarily shown. As is conventional in such installations, the turret 10 is carried on a ram 12 which is mounted for vertical reciprocation on a saddle 14. The saddle 14, in turn, is mounted for horizontal translation along rail structure 16.

In the illustrated embodiment, the turret 10 comprises a five sided turret head 18 having a plurality of radially extending tool holding sockets 20 spaced about its circumference. To lock individual tools 21 within the sockets 20, each of the sockets 20 is provided with a clamp 22 (see FIG. 3) and any appropriate number of pins 24. The clamp 22 is operated by manipulating a plug and screw arrangement 26 which is well known. The pins 24 engage in a slot and pin-type clamp 22 engages in a bore (unnumbered) in the shank of a tool (not shown) to prevent movement of the tool within the socket 20.

Figures 2, 3:
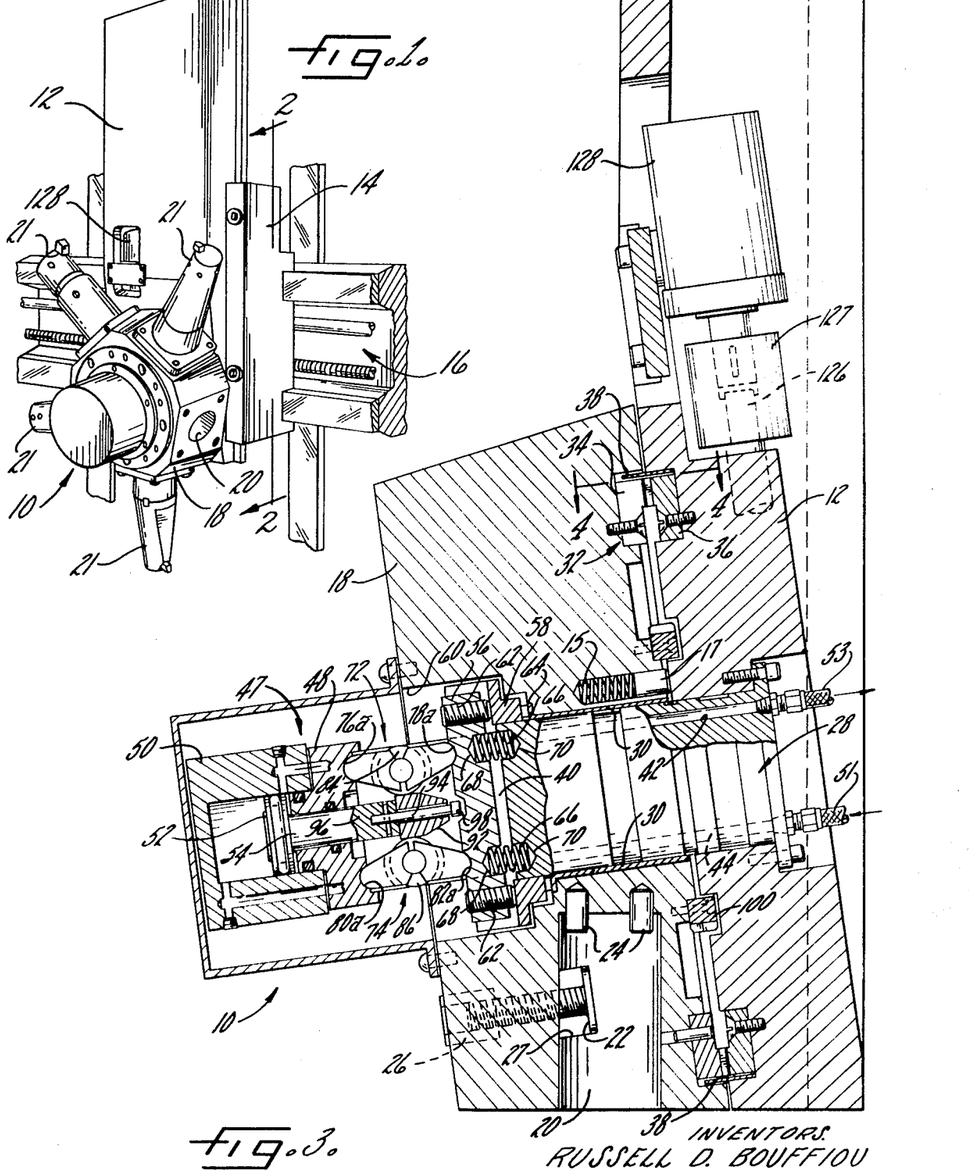
FIG. 2 is an elevational rear view of the ram and turret assembly; the view being taken along line 2—2 of FIG. 1.
FIG. 3 is an enlarged cross-sectional view showing in detail part of the turret mechanism and its associated ram mountings, the cross section being taken along line 3—3 of FIG. 2.
Figure 2:
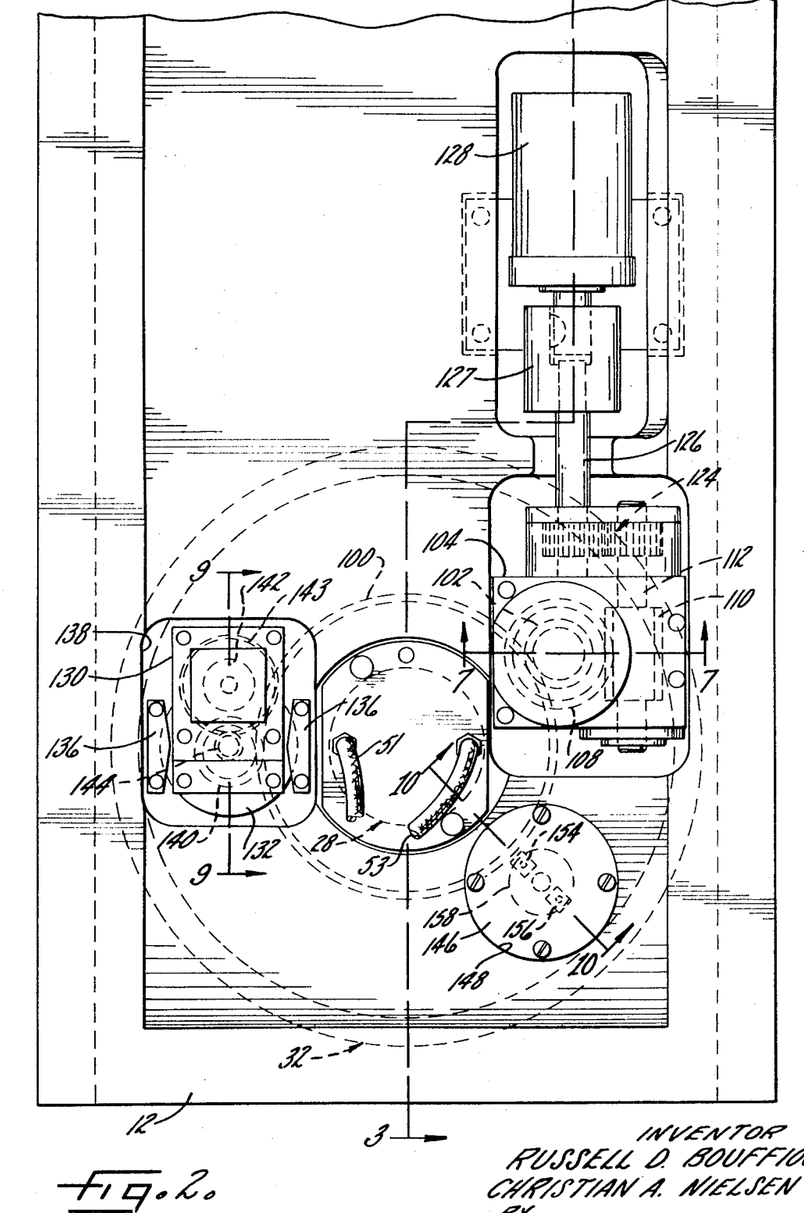

By way of further orientation, provision is also made to rotatively index the head 10 and any one of the five mounted tools 21 into cutting position where it may be accurately located and clamped. For that purpose, the head 10 is supported for rotary and limited axial motion on a stem 28 which, in turn, is fixed to the extended end of the ram 12 as shown in FIG. 3. Preferably, the turret head 18 is lined with bearing material 30 to provide a durable seat for the stem 28.

Experience with prior rotatable turret heads and turret head clamps has shown that these clamps must be relatively powerful because they are required to withstand forces imparted by cutting tools. These forces can be very high and are often magnified by the use of cutting tools supported at considerable distances from the turret head by long tool shanks. Moreover, cutting tools and turret heads mounting them are also subjected to interrupted cuts which may impart severe shock loads to the turret head assembly.

TURRET HEAD CLAMPING AND SECURING MECHANISM

In accordance with one aspect of this invention, the turret head 10 may be releaseably secured in any one of a large plurality of angular positions through the use of meshing teeth coupling means which may be of the crown gear type. This coupling provides a great radial support for the head 10 on the ram 12, and thus overcomes the above problem. The coupling device, shown generally at 32, may thus be conceived as two inter-engaging, self-centering sets of axially formed teeth. One such set of teeth 34 is secured to the turret head 10 and the other set 36 is secured to the ram 12. To insure that little or no appreciable wear will occur in the coupling means for many years, these two sets of teeth 34 and 36, when engaged, bear on one another on a great many points throughout their entire ring surface as will be noted from reference to FIG. 4. Additionally, since these parts are of the crown gear type, they may be initially made with great dimensional accuracy. This means that the turret head may be indexed and re-indexed to any of a great number of angular positions, time after time, while the head will always position the tip of the cutting tool with great precision. A ring-like shield 38 surrounds the coupling members to keep out dirt and foreign matter when the head 10 and coupling member 34 are disengaged from coupling member 36 and ram 12. To prevent accidental clamping of the turret head 10, the coupling members 34 and 36 are biased out of engagement by springs 15 and pins 17 (of which only one is shown in FIG. 3) which urge the turret head 10 along the stem 28 away from the ram 12 (to the left, as shown in FIG. 3). This bias is overcome by actuation of a clamping motor 47, as described in more detail hereinafter.

Figures 4, 5:
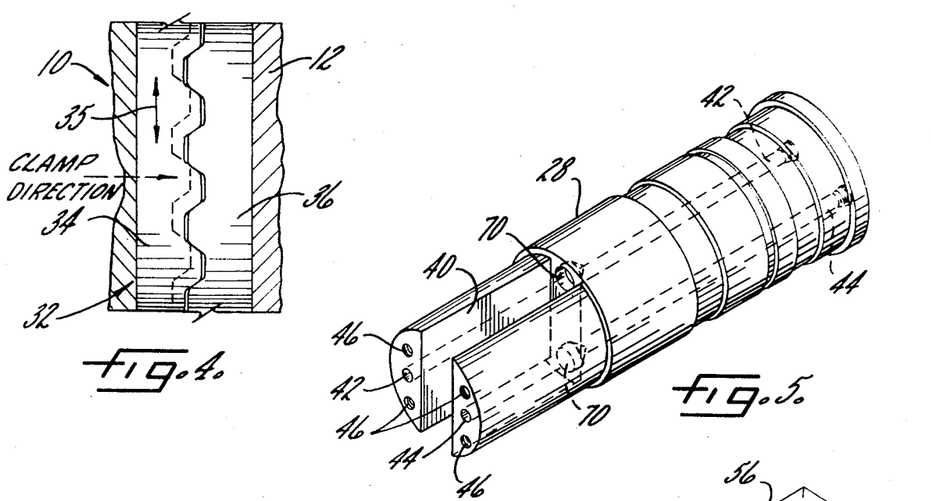
FIG. 4 is a segmental cross-sectional view of the turret-ram engagement piece, taken along line 4—4 in FIG. 3.
FIG. 5 is a perspective view of the turret stem shown in FIG. 3.

The stem 28, shown in its assembled position in FIG. 3, is shown alone in greater detail in FIG. 5. There can be seen that a diametrical slot 40 is provided in the end thereof, and that tubular passageways 42 and 44 are provided so as to allow flow of hydraulic fluid from one end of the stem 28 to the other. The clamping actuator 47, which is shown as a hydraulic cylinder is secured to the stem 28, typically by screws threaded in the tapped holes 46. The actuator 47 includes a head 48 and a body 50. This cylinder head 48 and body 50 encase a hydraulic piston 52, and a piston rod 54 which, in this particular embodiment, is shown integral with the piston 52. This hydraulic cylinder arrangement operates a clamp toggle mechanism described below. Hydraulic fluid is introduced to the cylinder assembly by supply and return lines 51 and 53 and the passageways 42 and 44 from a circuit to be described later.

In accordance with an overall aim of the invention, provision is made for urging the head 18 axially along the stem 28 so that the associated coupling members may engage and lock the device in a tool working position. The clamp toggle mechanism includes a pusher bar 56, which, as shown in FIG. 3, retained in the stem slot 40. Both ends of the pusher bar 56 project laterally beyond the surfaces of stem 28 into overlapping engagement with a slotted collar 58, which is housed in a counterbore 60 provided in the turret head 10. Two screws 62 having threaded engagement with the pusher bar 56 and the collar 58 provide adjustable thrust bearing contact between the pusher bar 56 and the collar 58. To allow relatively free rotation the turret head 10 when it is unclamped, an anti-friction thrust bearing, indicated generally at 64, it is interposed between the collar 58 and the turret head 10.

Figure 6:
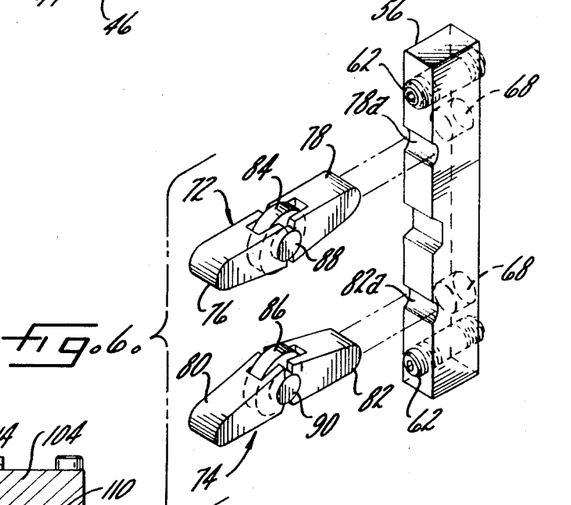
FIG. 6 is an exploded perspective view of the clamp toggle and pusher bar members shown in FIG. 3.

To bias the pusher bar 56 toward the cylinder end of the stem, or to the left as shown in FIG. 3, two springs 66 retained in mutually opposed bores 68 and 70 in the pusher bar 56 and stem 28 respectively. Two sets of toggles shown generally at 72 and 74 are deployed in thrust bearing relationship between the pusher bar 56 and the cylinder head 48. Each toggle set 72 and 74, both of which are visible in FIG. 6, includes a pair of linkages 76, 78, 80, and 82. The inner ends of each of the four linkages are formed to cradle rollers 84 and 86 therebetween. The outer ends of the linkages engage corresponding bearing surfaces 76a, 78a, 80a, and 82a in the cylinder head 48 and the pusher bar 56. Pins 88 and 90, on which the respective rollers 84 and 86 are journalled, provide central pivot bearing for the four linkages. A wedge piece 92 is provided between the rollers 84 and 86.

To provide a self-centering motion to the wedge 92 is accordance with one aspect of the invention, this wedge 92 is attached to the piston rod 54 by a large pin 94 which extends co-axilly with the piston rod 54. The pin 94 itself is rigidly attached to the piston rod 54 by any convenient means; here, a small drift pin 96 is used. The pin 94 is sized to provide the wedge 92 with a limited freedom of axial and radial movement thereon. The radial freedom permits the wedge 92 to move upward or downward as shown in the figure, so that the wedge 92 is self centering when it is pushed into engagement with the rollers 84 and 86 by the piston rod 54 and piston 52. The axial freedom enables the head 98 of the pin 94 to deliver a hammer blow to the wedge 92 when it is desired to dislodge the wedge 92 and withdraw it from engagement with the toggles 72 and 74. The wedge withdrawal is effected by moving the piston rod 54 and piston 52 to the left, as shown in FIG. 3.

As can be seen, when the wedge 92 is thrust into engagement with the rollers 84 and 86, thus straightening the toggles 72 and 74, the pusher bar 56 is subjected to high force loads and some deflection. Further in accordance with the invention, under normal conditions and force loads, the desired clamping force is transmitted through the pusher bar 56 to the collar 58 and thus to the head 10 with some related amount of bending of the pusher bar 56 which may be thought of as a beam member in this application. Now, in the event that abnormally high pressures are built up in the toggle members, such as might occur due to maladjustment of the screws 62 or greater than normal travel of the piston 52 to the right, or for some other reason, the pusher bar 56 will merely deflect a small additional amount, thereby harmlessly dissipating the overload. Without the dissipating actions of the pusher bar 56, the overload may result in serious damage to the vital parts of the turret assembly.

ROTARY DRIVE FOR TURRET

Figure 7:
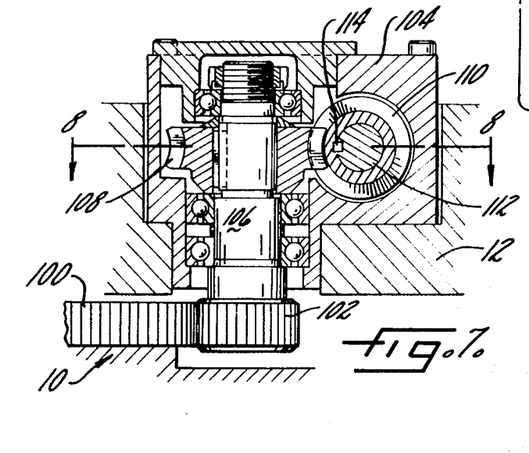
FIG. 7 is a cross-sectional view of the turret head rotating drive mechanism taken along line 7—7 of FIG. 2.

To rotate the turret head 10 from one work engaging position to another, a novel rotary drive for the turret is provided. As shown in FIG. 3, the head 10 has rigidly attached to it a ring gear 100 located co-axilly with it and with the stem 28. A driving pinion 102, which is shown in FIGS. 2, and 7, engages the ring gear 100. The driving pinion 102 and its associated mechanism is supported in a gear housing 104 which, in turn, is secured by appropriate means to the backside of the ram 12. Returning to FIG. 7, it can be seen that the drive pinion 102 is rigidly attached to the shaft 106, which shaft is secured in housing 104 and is provided with bearings in the usual manner. Fixed to this shaft 106 is a worm gear 108 which, in turn, engages a worm 110. As more clearly seen in FIG. 8, the worm 110 is mounted on yet another shaft 112. The key 114 which connects the worm 110 to the shaft 112 does not provide a rigid attachment, but allows sliding axial motion of the worm 110 along the shaft 112 in the direction of the arrows while prohibiting rotational movement of worm 110 with respect to shaft 112. Springs 116 and 118 of the type commercially known as Bellville springs are disposed on each side of the worm between the thrust bearings 120 and 122; these springs 116 and 118 maintain the worm 110 in an approximate central position between the bearings 120 and 122. As shown, shaft 112 is drivingly connected to a hydraulic rotary drive motor 128 (shown in FIG. 2) by the gear train 124, shaft 126, and coupling 127.

Figure 8:
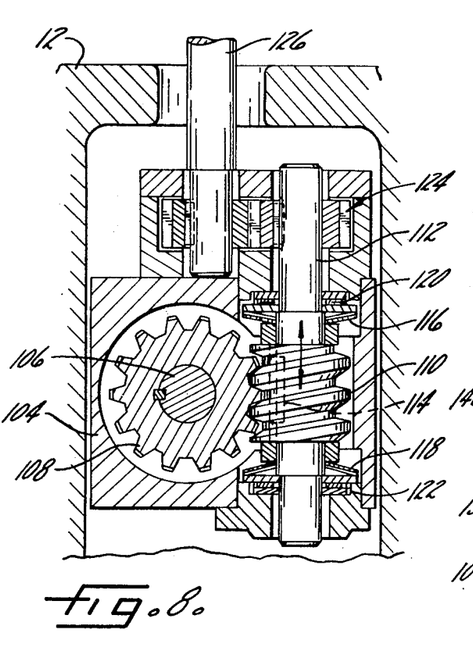
FIG. 8 is a cross-sectional view of a further detail of the turret head rotating mechanism taken along line 8—8 of FIG. 7.

The utility of this novel lost motion worm drive will be readily apparent after a summarization and review of how the parts thus far described function. When hydraulic fluid is introduced, by a circuit to be later described, through the fluid lines 51 and 53 and the stem 28 to the hydraulic cylinder apparatus 48 and 50, the fluid moves the piston 52, the piston rod 54 and the wedge 92 to the left, as seen in FIG. 3, thus disengaging the toggles 72 and 74. The head 10 will then also move axially to the left along stem 28, being urged in that direction by the springs 15 and pins 17. This motion disengages the toothed coupling means 32. Now, when hydraulic motor 128 is activated, the rotational motion of its shaft 126 will be imparted through the drive train to the head drive pinion 102, the ring gear 100 and thus to the head 10 itself. When the head 10 has reached its approximate desired position, the hydraulic motor 128 stops and motion of the turret head 10 ceases, but the teeth of the coupling members 34 and 36 will probably be positioned slightly out of their true meshing position but still within engagement tolerances as shown by the dotted lines in FIG. 4. Hydraulic fluid is then applied through stem 28 to the head of the piston 52, forcing this piston 52 to the right, thus in turn forcing wedge 92 to straighten the toggles 72 and 74. This motion forces the turret head 10 to the right, engaging the coupling members 34 and 36. As the teeth of the coupling members engage, the head 10 will rotate slightly in one direction or the other as indicated by the arrow 35 in FIG. 4 allowing the coupling to seek its true mesh. When this occurs, a somewhat magnified motion is imparted by head 10 through the geared train 102, 106, and worm gear 108 to the worm 110. As seen in FIG. 8, this rotation of worm gear 108 (which, as noted above, may be in either direction) will force the worm 110 up or down the shaft 112 without substantial rotative force being applied to the shaft 112 or, ultimately, the motor 128, and the force of this motion will be dissipated in either of bellville springs 116 or 118. Without an accommodation for losing this motion caused by engagement of the meshing coupling, the turret drive mechanism would be subject to severe overloading and possible breakage.

RESOLVER FEEDBACK

Accurate positioning of the turret head 10 in any one of its five predetermined index positions requires actuation of the hydraulic motor 128 to rotate the turret head to the desired index position with an accuracy within the meshing tolerance of the coupling members 34 and 36. To achieve this accuracy, the motor 128 is included as a part of a closed loop control circuit. Suitably, this circuit may be of the type including a resolver 142 as the feedback element. For a detailed explanation of a suitable control circuit of the foregoing type, reference is made to copending application Ser. No. 632,591, now U.S. Pat. No. 3,553,647. A general discussion will, therefore, suffice here.

Figure 12:
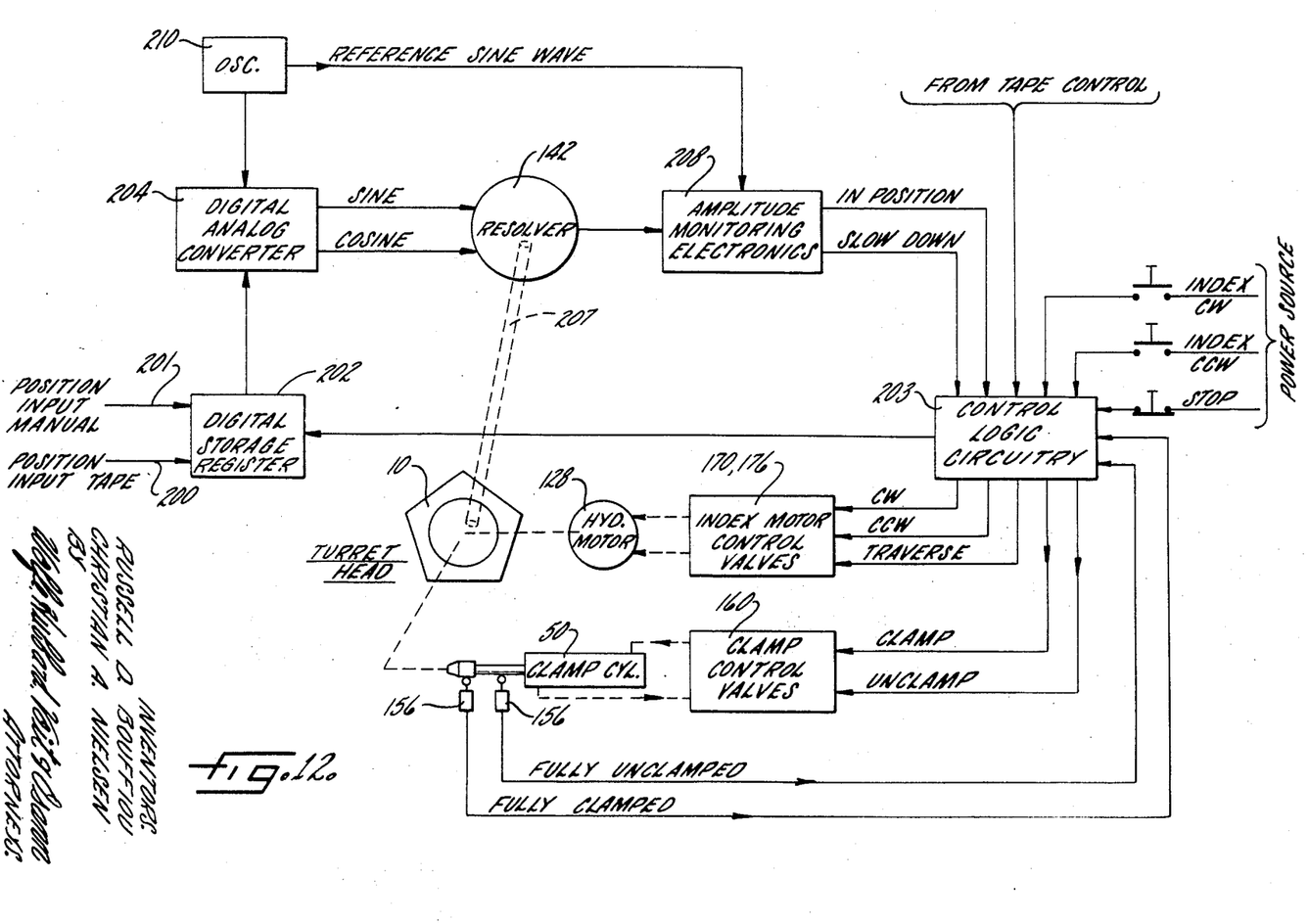
FIG. 12 is a schematic illustration of the electrical circuitry used in the device.

Referring to FIG. 12, each of the five index positions for the turret head 10 is uniquely represented by a digital signal. Accordingly, as a prerequisite to indexing the turret head 10 from one of its index positions to any other, the digital signal for such other or next index position is fed into a digital storage register 202 from either a program-type input 200 or a manual input 201. Then, when the machining operation with the turret head 10 in the first of its positions is completed, a manual or programmed command is supplied to the control logic circuitry 203 to, in turn, provide an enabling or "read out" signal for the register 202. Thereupon, the register 202 is emptied into a digital-to-analog converter 204, which converts the position information of the digital signal to a corresponding voltage and combines such voltage with a carrier wave supplied by an oscillator 210 to provide excitation voltages of the proper amplitudes for the sine and cosine windings of the resolver 142.

The resolver 142 (FIGS. 2, 9 and 12) is mechanically geared to or otherwise coupled with the turret head 10, as indicated by the dashed line 207, in FIG. 12 such that rotation of one bears a predetermined relationship to rotation of the other, e.g., a 1:1 relationship. To derive an error signal representative of the phase difference between the actual and desired positions of the turret head 10 and the direction of such phase difference, the output from the resolver 142 is discriminated against a reference signal of the carrier frequency, which is conveniently supplied by the oscillator 210. As will be appreciated, the error signal, therefore, has an amplitude indicative of the phase difference and a sense or polarity indicative of the direction of the phase difference. The error signal is fed to the logic circuitry 203 which generates control signals for the control valves 170, 176. Accordingly, the motor 128 is actuated to rotate the turret head 10 toward its next position via the most expeditious route.

Of course, the amplitude of the error signal approaches a zero or null state as the turret head 10 approaches its desired index position. This characteristic is advantageously utilized to generate "slow down" and "stop in position" signals. More particularly, as diagrammatically illustrated by showing the aforementioned discrimination as being affected in amplitude monitoring electronics 208, reduction of the phase difference between the actual and desired positions of the turret head 10 to some predetermined small angle results in the production of the "slow down" signal. The "slow down" signal is applied to the logic circuitry 203 to modify the control signals supplied to the control valves 170 and 176, so that the driving speed of the hydraulic motor 128 is reduced stepwise to a lower or "creep speed." Further, when the turret head 10 reaches the desired index position, the resulting nulled error signal is detected to provide the "stop in position" signal, which is applied to the logic circuitry 203 to terminate the actuation of the motor 128.

Figure 9:
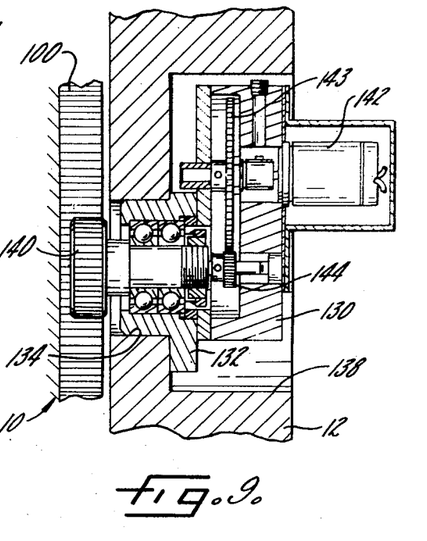
FIG. 9 is a cross-sectional view of the resolver position feedback device, taken along line 9—9 of FIG. 2.

Preferably, the feedback resolver 142 is included as a part of a unitized assembly to be housed in a gear box 130 secured to the ram 12. As shown in FIGS. 2 and 9, the resolver 142 is supported by the gear box 130 and has its output shaft coupled via a gear train 140, 143, and 144 to the ring gear 100 of the turret drive. The ratios of the gears 100, 140, 143 and 144 establish the aforementioned predetermined relationship between rotation of the turret head 10 and resolver 142. Desirably, to afford a high degree of accuracy in maintaining that relationship, provision is made to minimize the backlash in the gear train. To this end, the gear box 130 is formed with an eccentric mounting hub 132 which is received in a bore 134 at the rear of the ram 12 and in which the pickoff pinion 140 is journalled. The clearance between the pickoff pinion 140 and the ring gear 100 can, therefore, be adjusted by rotating the gear box 130 relative to the ram 12. The gear box 130 can be secured to the ram 12 with sufficient rigidity for support by a pair of strap-type clamps 136 and still rotatably adjustable to some limited extent.

LIMIT SWITCH

Figure 10:
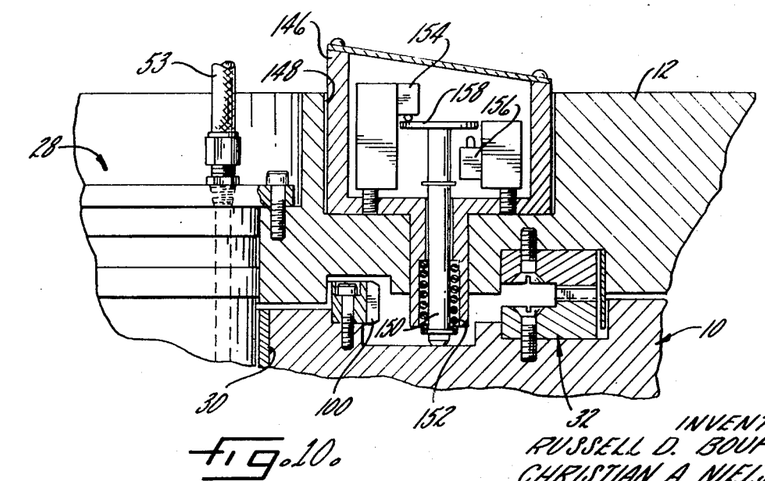
FIG. 10 is a cross-sectional view of the turret limit switch assembly, taken along line 10—10 of FIG. 2.

A limit switch assembly, as shown in FIG. 10, is provided to emit signals indicating on the one hand, that the head 10 is fully clamped to the ram 12, and on the other hand that the head is fully released therefrom and is free to be indexed. The assembly consists of a limit switch assembly box 146 which is supported in a recess 143 as shown in FIGS. 2 and 10. A trip pin 150 is reciprocally supported, in any normal manner, in the box 146 and is biased by spring 152 into engagement with the inner face of the head 10. Two limit switches 154 and 156 are adjustably secured to the box 146 for cooperation with a washer 158 projecting from one end of the pin 150. The two limit switches 154 and 156 are spaced relative to the washer 158 so as to provide signals to indicate that the head is fully clamped to the ram, when the pin 150 is in its extreme up position as shown in the figure, or that the head is fully released from the ram and is therefore free to be indexed, when the pin 150 is in its extreme down position.

HYDRAULIC SYSTEM

Figure 11:
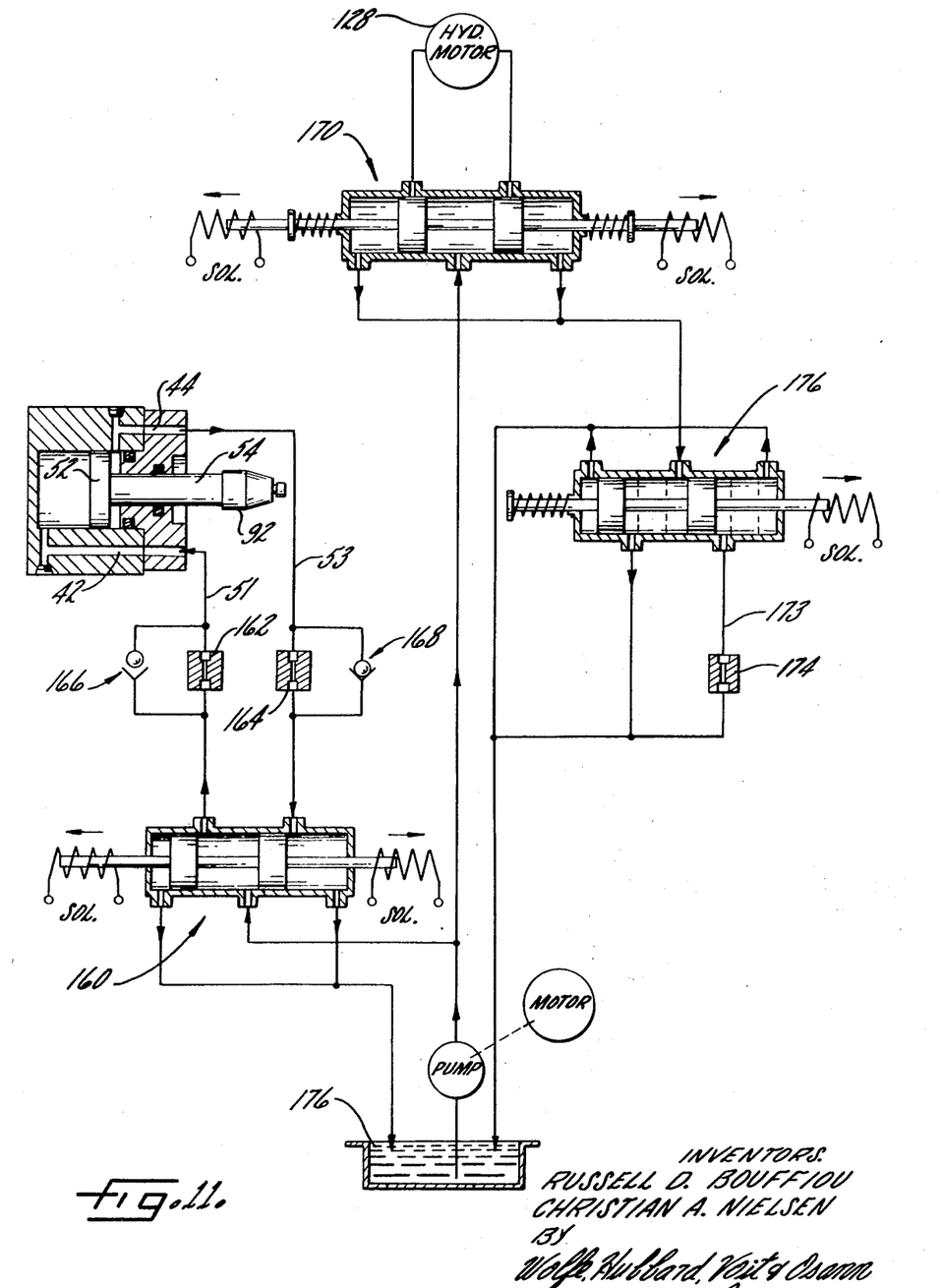
FIG. 11 is a schematic illustration of the hydraulic circuitry employed in the mechanism.

The hydraulic system which operates the turret head drive motor 128 and the turret clamping cylinder 47 is diagrammatically illustrated in FIG. 11. Hydraulic pressure is selectively applied to opposite sides of the piston 52 through lines 51 and 53 and passageways 42 and 44 by a four-way, two position solenoid operated reversing valve, shown symbolically at 160. Restrictors 162 and 164 and a bypass valve 166 and 168 are provided in each of the lines to control the speed of the clamping operation while insuring that full pressure is applied for final clamping.

Hydraulic pressure is supplied to the turret head indexing motor 128 through a four-way, three position control valve 170 adapted to selectively control the direction of rotation of the motor or to stop the motor at a desired indexed position by blocking both hydraulic passages to the motor as shown. The line 173 between the valve 170 and the reservoir 175 is provided with a restrictor 174 which may be selectively inserted in the line by operation of a spring loaded four-way, two position solenoid valve 176. This restrictor 174 slows the hydraulic indexing motor 128 just prior to its completely stopping when the turret head arrives at the selected index position. The two position selector valve 176 is arranged so that the restrictor 174 is normally bypassed to provide for rapid indexing of the head between indexed positions.

SUMMARY

From the foregoing, it will be appreciated that the present invention provides a power operated rotary indexing mechanism which is durable and efficient. More particularly it will be understood that the invention enables an indexed member (e.g., a turret) to be rapidly and respectively indexed to any predetermined angular position with a high degree of angular precision. It will also be understood that despite the precision of the rotary indexing mechanism here disclosed it is capable of withstanding the loads imparted to it under normal and even most abnormal operating conditions.

I claim as my invention:

1. In a power operated machine tool, the combination of
   a. a rotatable and axially movable turret having a plurality of sockets for supporting individual tools,
   b. a drive coupled to said turret for rotating the turret in either direction,
   c. a resolver means for automatically determining when said turret has been angularly displaced to a pre-selected position,
   d. a turret position-fixing means comprising a first ring gear secured to said turret and a second ring gear attached to another part of the machine tool and meshably engageable with the first ring gear,
   e. means for selectively moving said turret in an axial direction to engage said first and second ring gears,
   f. said turret moving means including a force exerting means and an elongated bendable pusher bar for transmitting forces between said force exerting means and said turret, said elongated bendable bar being flexed by forces in excess of that required to securely engage said first and second ring gears to dissipate said excessive forces,
   g. means for selectively moving said turret in an axial direction to disengage said first and second ring gears, and
   h. sensing means for determining when said turret has been axially displaced a sufficient distance so that said ring gears are out of engagement and said turret may be rotatably displaced to a different position.

2. In a power operated machine tool, the combination of
   a. a rotatable turret having a plurality of sockets for supporting individual tools,
   b. a drive coupled to said turret for rotating the turret in either direction to any one of a plurality of angulariy displaced positions,
   c. a turret position-fixing means comprising a substantially plane crown tooth ear having axial teeth thereon and fixedly attached to the turret, and a second ring meshably engageable with the first ring, said second ring being fixedly attached to another part of the machine tool,
   d. said drive having a lost motion drive mechanism comprising a worm gear and a worm, said worm engaging said worm gear and being slidable within fixed limits upon a shaft, opposed springs normally holding said worm intermediate of said limits but permitting translation of said worm to said limits to allow said turret head to be fixed in one of said angularly displaced positions even though the turret may be rotated an amount less than the engagement tolerance of the turret position fixing means when the turret position fixing means is engaged,
   e. resolver means for automatically determining when the turret has been angularly displaced to a position less than the engagement tolerance of the turret position fixing means away from a true mesh position of said turret position fixing means,
   f. means for rotating the turret and parts fixedly attached thereto in that direction providing the most expeditious route from said one position to said other position, and
   g. a sensing means to determine when the turret and parts fixedly attached thereto have been linearly displaced an amount sufficient to allow free rotational displacement of the turret to some other position.

3. A device according to claim 2, in which the said opposed springs are of the circular variety and are found upon the shaft which carries the worm.

4. In a power operated machine tool, the combination of
   a. a rotatable turret having a plurality of sockets for supporting individual tools,
   b. a stem upon which the turret is journalled,
   c. a mechanism which prevents angular motion of the turret with respect to the stem,
   d. means for urging the turret axially along the stem into fixed engagement with said angular motion-preventing mechanism,
   said means having at least a cylinder fixed in position with respect to the stem and capable of having a fluid introduced thereinto,
   a piston member slidable within the cylinder,
   a wedge member attached to the piston member,
   at least one toggle member capable of being straightened by the motion of the wedge member,
   one portion of said toggle member engaging a member fixed to the stem, and another portion engaging a pusher, the pusher being movable with respect to the stem, and the pusher also urging the turret axially along the stem into engagement with the said turret position-fixing means.

5. A mechanism according to claim 4, in which the wedge member is formed so that when the toggle is fully straightened, that portion of the toggle which contacts the wedge member rests upon a wedge member surface which is substantially planar and which, surface is substantially parallel to the line of direction in which the wedge member is capable of being moved.

6. A device according to claim 5 in which the wedge member is partially free with respect to the piston, the direction in which the piston moves thus allowing an impact force to be imparted to the wedge member to assist in dislodging the said wedge members' engagement with the toggle when the piston begins to move.

7. A device according to claim 4 in which the toggle member and pusher member are carried substantially inside the volume of space enclosed by the outline of the stem.

8. A device according to claim 4 in which the pusher member is at least slightly deformed when engaged simultaneously by the toggle and by the turret.

9. In a power operated machine tool, the combination of
   a. a rotatable machine tool member,
   b. mechanical positioning means having one portion mounted for rotation with said member and a second non-rotatable portion for locating and retaining said member in any of a plurality of angularly displaced positions,
   c. indexing means coupled to said member for selectably rotating said member to any one of said positions,
   d. actuatable means for selectively providing a clamping force to engage said first and second portions of said mechanical positioning means to clamp said member in any one of said positions,
   e. said actuatable means including a force exerting means and an elongated pusher bar for transmitting forces between said force exerting means and one of said mechanical positioning portions, said force exerting means engaging said bar at at least one point along the length thereof and said one mechanical positioning portion engaging said bar at a different point along the length of said bar so that forces in excess of that required to securely engage said first and second portions cause a deflection of said bar and are thereby dissipated.

10. In a power operated machine tool, the combination of a linearly movable wedge member,
   at least one complementary pair of toggle linkage members so positioned as to be straightened by the motion of the wedge member, and
   tool holding means rotatable upon an axis and capable of linear motion when the toggle member is straightened.

11. A combination according to claim 10 including at least one roller member, the roller member being so positioned as to rollingly engage the wedge members and also engage at least one pair of toggle link members.

12. A combination according to claim 10 wherein a pusher member is engaged by at least one toggle of the said toggle members, the pusher member causing linear axial motion in the rotatable tool holding member when said toggle undergoes straightening motion.

13. A combination according to claim 12 wherein the pusher member is deformed a minimum amount when engaged by the toggle member, and wherein more than minimal forces of engagement produce more than minimal deformation of the said pusher member without altering the relative position of any other member.

14. A combination according to claim 10 wherein the linear motion of the wedge member is caused by the combination of a piston member and a fluid cylinder member.

15. A combination according to claim 14 wherein the wedge member is connected to the piston member by a pin member.

16. A combination according to claim 15 wherein the wedge member is capable of limited motion upon the pin member.

* * * * *